US012647322B2

(12) United States Patent
Manohar Nirikhi et al.

(10) Patent No.: US 12,647,322 B2
(45) Date of Patent: Jun. 2, 2026

(54) NETWORK CONNECTIVITY AND REACHABILITY MONITORING IN A CLOUD ENVIRONMENT

(71) Applicant: Oracle International Corporation, Redwood Shores, CA (US)

(72) Inventors: Sandeep Manohar Nirikhi, Bengalaru (IN); Jody Wayne Davis, Owasso, OK (US); Soumee Phatak, Pune (IN)

(73) Assignee: Oracle International Corporation, Redwood Shores, CA (US)

( * ) Notice: Subject to any disclaimer, the term of this patent is extended or adjusted under 35 U.S.C. 154(b) by 458 days.

(21) Appl. No.: 18/367,372

(22) Filed: Sep. 12, 2023

(65) Prior Publication Data

US 2025/0088423 A1     Mar. 13, 2025

(51) Int. Cl.
H04L 41/0895     (2022.01)
H04L 41/342     (2022.01)
H04L 43/20     (2022.01)

(52) U.S. Cl.
CPC ........ H04L 41/0895 (2022.05); H04L 41/342 (2022.05); H04L 43/20 (2022.05)

(58) Field of Classification Search
CPC .... H04L 41/0895; H04L 41/342; H04L 43/20
See application file for complete search history.

(56) References Cited

U.S. PATENT DOCUMENTS

| | | | |
|---|---|---|---|
| 2009/0290498 A1 | 11/2009 | Bajpay et al. | |
| 2021/0168034 A1* | 6/2021 | Qian | H04L 41/22 |
| 2022/0094614 A1* | 3/2022 | Khurshid | H04L 41/147 |
| 2024/0259292 A1* | 8/2024 | Liu | H04L 41/145 |

OTHER PUBLICATIONS

"Catch Issues Before They Impact Your Business", Discover the Power of Internet Performance Monitoring, Catchpoint, Available Online at: https://www.catchpoint.com/, Accessed from Internet on Jul. 25, 2023, 8 pages.
"Cloud Application Monitoring", Catchpoint IPM, Available Online at: https://www.catchpoint.com/application-experience/cloud-application-monitoring, Accessed from Internet Jul. 25, 2023, 5 pages.

(Continued)

*Primary Examiner* — Suraj M Joshi
(74) *Attorney, Agent, or Firm* — Kilpatrick Townsend & Stockton LLP

(57)     ABSTRACT
The present disclosure relates to network connectivity and reachability monitoring in cloud environments. In an example, a computer receives, from a device of a customer, input indicating a destination that belongs to a virtual cloud network and a set of vantage points for testing the destination. Based on the input, a first source is deployed to a first network location associated with a first vantage point and a second source is deployed to a second network location associated with a second vantage point. Each source is configured to send probes of different types to the destination. The computer system receives, probe data from each source based on probes sent by the source to the destination. Based on the received probe data, the computer system generates test data indicating at least one of connectivity or reachability of the destination. The test data is presented at a user interface.

20 Claims, 12 Drawing Sheets

(56)                    References Cited

OTHER PUBLICATIONS

"Connection Troubleshoot Overview", Available Online at: https://learn.microsoft.com/en-us/azure/network-watcher/network-watcher-connectivity-overview, Mar. 22, 2023, 2 pages.

"Diverse Network Monitoring Applications, One Tool", Available Online at: https://www.manageengine.com/network-monitoring/network-monitoring-applications.html, Accessed from Internet on Jul. 28, 2023, 4 pages.

"Global Vantage Points", Available Online at: https://docs.thousandeyes.com/product-documentation/global-vantage-points, Accessed from Internet on Jul. 28, 2023, 1 page.

"How OpManager Enterprise Edition Operates", Available Online at: https://www.manageengine.com/network-monitoring/help/enterprise-edition-operation.html, Accessed from Internet on Jul. 25, 2023, 6 pages.

"How Reveal(X) 360 Works", ExtraHop, Available Online at: https://www.extrahop.com/products/cloud/how-it-works/, Accessed from Internet on Jul. 28, 2023, 8 pages.

"Identify Network Performance Issues", ExtraHop, Available Online at: https://www.extrahop.com/use-cases/it-ops/resolve-performance-issues/, Accessed from Internet on Jul. 28, 2023, 2 pages.

"Internet Performance Monitoring", Catchpoint IPM, Available Online at: https://www.catchpoint.com/internet-performance-monitoring, Accessed from Internet on Jul. 25, 2023, 6 pages.

"Modern Application Performance Monitoring (APM)", Available Online at: https://www.datadoghq.com/product/apm/, Accessed from Internet on Jul. 28, 2023, 2 pages.

"NetNORAD: Troubleshooting Networks via End-to-End Probing", Available Online at: https://engineering.fb.com/2016/02/18/core-data/netnorad-troubleshooting-networks-via-end-to-end-probing/, Accessed from Internet on Jul. 28, 2023, 5 pages.

"Network Experience", Catchpoint Internet Performance Monitoring, Available Online at: https://www.catchpoint.com/network-experience, Accessed from Internet on Jul. 25, 2023, 6 pages.

"Network Monitoring Software", Sloarwinds, Available Online at: https://www.solarwinds.com/network-performance-monitor/use-cases/network-monitoring-software, Accessed from Internet on Jul. 28, 2023, 3 pages.

"Network Performance Monitoring", Available Online at: https://www.datadoghq.com/product/network-monitoring/network-performance-monitoring/, Accessed from Internet on Jul. 28, 2023, 2 pages.

"Proactive Incident Management", Catchpoint Internet Performance Monitoring, Available Online at: https://www.catchpoint.com/customer-experience/incident-management, Accessed from Internet on Jul. 25, 2023, 8 pages.

"Proactive Synthetic Monitoring for a Good Night's Sleep", Catchpoint, Available Online at: https://www.catchpoint.com/synthetic-monitoring, Accessed from Internet on Jul. 28, 2023, 2 pages.

"Reveal(x) 360", ExtraHop, Available Online at: https://www.extrahop.com/products/cloud/, Accessed from Internet on Jul. 28, 2023, 2 pages.

"Reveal(x) NPM", Available Online at: https://www.extrahop.com/solutions/performance/, Accessed from Internet on Jul. 28, 2023, 5 pages.

"Root Cause Analysis", Available Online at: https://www.manageengine.com/network-monitoring/root-cause-analysis.html, Accessed from Internet on Jul. 28, 2023, 7 pages.

"Troubleshooting Network Issues", Available Online at: https://www.manageengine.com/network-monitoring/troubleshooting-network-issues.html, Accessed from Internet on Jul. 25, 2023, 13 pages.

"What is Distributed Tracing and Telemetry Correlation?", Azure Monitor, Available Online at: https://learn.microsoft.com/en-us/azure/azure-monitor/app/distributed-tracing-telemetry-correlation, Mar. 30, 2023, 2 pages.

Fang et al., "VTrace: Automatic Diagnostic System for Persistent Packet Loss in Cloud-Scale Overlay Network", SIGCOMM '20: Annual conference of the ACM Special Interest Group on Data Communication on the applications, Technologies, Architectures, and Protocols for Computer Communication, Available Online at: https://dl.acm.org/doi/10.1145/3387514.3405851, Jul. 2020, pp. 31-43.

* cited by examiner

Receive input to test destination 710

Cause a set of sources to be deployed 720

Receive, from each source, probe data 730

Generate test data 740

Cause test data to be presented 750

NETWORK CONNECTIVITY AND REACHABILITY MONITORING IN A CLOUD ENVIRONMENT

BACKGROUND

The present disclosure relates to virtualized cloud environments. Techniques are described for network connectivity and reachability monitoring in such environments.

A cloud infrastructure, such as Oracle Cloud Infrastructure (OCI), can provide a set of complementary cloud services that enable enterprises to build and run a wide range of applications and services in a highly available hosted environment. The cloud infrastructure can offer high-performance compute, storage, and network capabilities in a flexible overlay virtual network that runs on top of the physical underlay network and that is securely accessible from multiple locations (e.g., a public network, a private network, an on-premises network, etc.).

Virtual networking is a foundation for cloud infrastructures and cloud applications because virtual networking enables the ability to access, connect, secure, and modify cloud resources. Virtual networking enables communication between multiple computers, virtual machines (VMs), virtual servers, or other devices across different physical locations. While physical networking connects computer systems through cabling and other hardware, virtual networking uses software management to connect computers and servers in different physical locations over the Internet. A virtual network uses virtualized versions of traditional network components, such as network switches, routers, and adapters, allowing for more efficient routing and easier network configuration and reconfiguration. Entities, such as customers and service providers, can configure private networks that are deployed on a cloud infrastructure. Such private networks can be referred to also as virtual private networks or virtual cloud networks.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
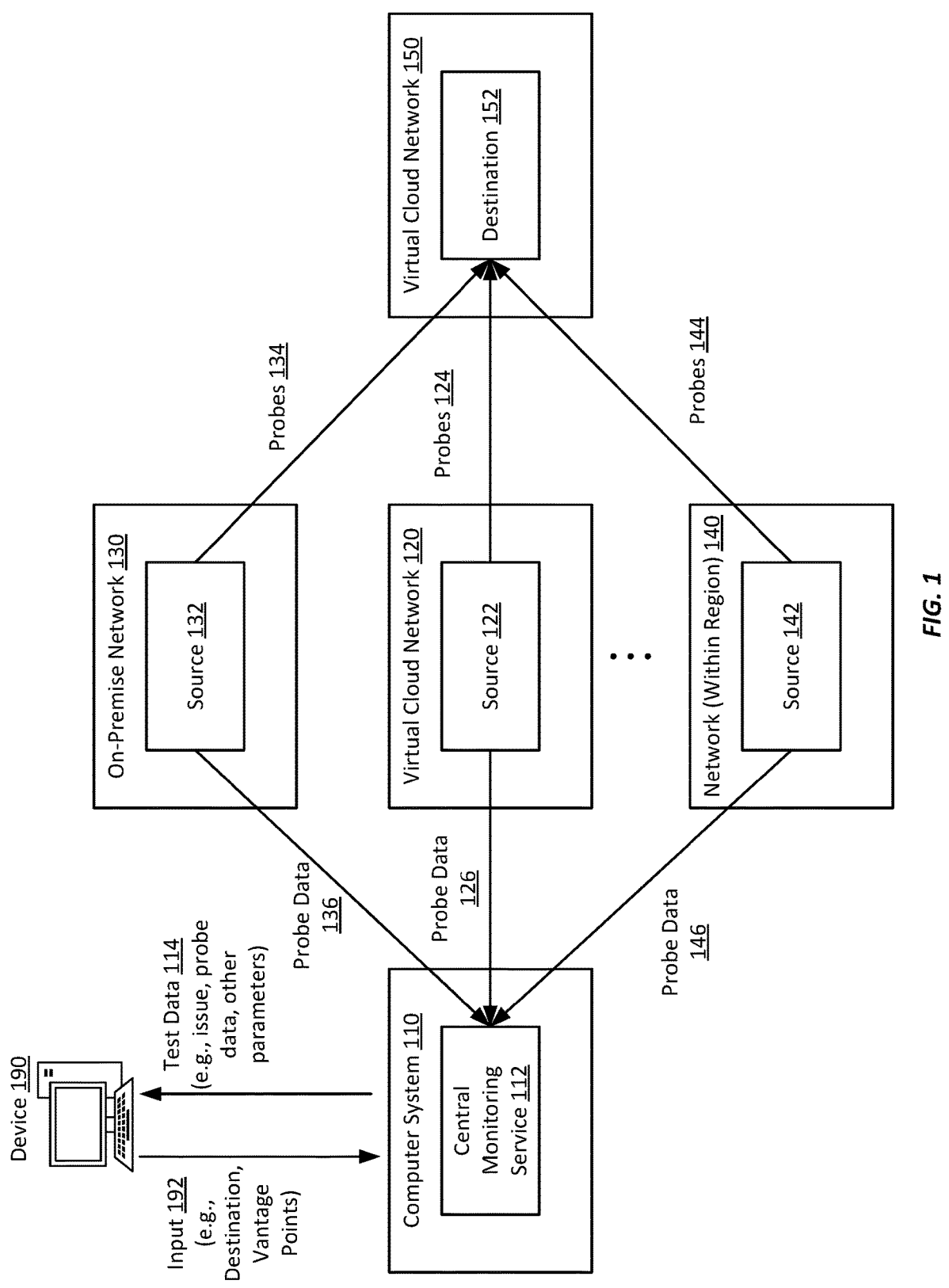
FIG. 1 illustrates an example computer environment that enables monitoring of reachability or network connectivity, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Embodiments of the present disclosure relate to network connectivity and reachability monitoring in cloud environments. In an example, a virtual cloud network (VCN) is configured for a customer. Access to a destination belonging to the VCN (e.g., an application or a compute instance) can be available from multiple network locations (e.g., from a public network, from an-premise network of the client, or from a private network of the client such as a VCN subnet). During the initial set-up, the destination may not be reachable, or connectivity thereto may be subject to particular issues (e.g., low latency, high jitter, etc.). Additionally, or alternatively, after the launch, the destination may become unreachable, or connectivity issues may arise. In both cases, it is desirable to monitor the connectivity and reachability of the destination from the different network locations. To be effective, the proactive or reactive monitoring may need to identify a network location of an issue and a network layer (e.g., Layer 3, Layer 4, Layer 7 of the Open Systems Interconnection (OSI)) at which the issue exists.

To do so, embodiments of the present disclosure provide an interface to a central monitoring system. Input of the customer can be received via the interface and can indicate various parameters for the monitoring. Among these parameters are an indication of a destination to be tested and an indication of set of vantage points from which the destination is to be tested. Each vantage point corresponds to a location from which the destination can be reached (e.g., a geographic location, a public network, an-on premise network, a private network, a VCN subnet, etc.) The central monitoring system deploys multiple sources to network locations associated with the vantage points (e.g., one or more sources in a network within the geographic region, one or more sources that can connect to the destination from the public network, one or more sources in the on-premises network, one or more sources in the private network, and/or one or more sources in the VCN subnet). Each source is configured to send probes to the destination. The probes can be of different types (e.g., Layer 3 probes, Layer 4 probes, Layer 7 probes, etc.). Depending on responses (or lack thereof) to probes sent from a source, the source can report back probe data to the central monitoring system. The probe data can indicate a test metric (e.g., destination reachable or not, network latency, network jitter, etc.). The central monitoring system can process the received from probe data to generate test using triangulation and correlation techniques. Triangulation is applied to probe data from different sources and enables determining a network location at which a reachability or connectivity issue arises. Correlation is applied to at least probe data of different types (possibly from the same source only) and enables determining a network layer (e.g., Layer 3, Layer 4, Layer 7) at which a reachability or connectivity issue arises. The central monitoring system can enable presentation of different test related parameters including the test data, the probe data, the network location of each source, the status of each source. The central monitoring system can enable changes to the testing, such as changing the set of vantage points, the destination, the type of probes, etc. These and other features are further described herein below.

A—Introduction to Cloud Virtualization

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premises servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment.

The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premisess network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken, and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses.

A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premises networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premises networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premises data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 12. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 17, 8, 9, and 10 (see references 1716, 816, 916, and 1016) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 8-12 and are described below.

B—Connectivity and Reachability Monitoring

Generally, while troubleshooting a reachability or connectivity issue, lots of teams across multiple information technology (IT) silos in an organization need to collaborate to be able to meaningfully narrow down the problem domain—be it in terms of analyzing an application versus network issues, or in terms of figuring out where in the network/application stack the problem lies.

Such a problem may also exist in a cloud infrastructure. In particular, a cloud services provider (CSP) can offer a hosting service to a customer. The hosting service can launch an endpoint in a cloud (e.g., a compute instance that provides a particular application, where the compute instance is a member of a private cloud configured by the CSP for the customer). In a cloud environment, enterprise customers have applications and services deployed across datacenters, private clouds, public clouds and the Internet (SaaS). Customer network operations and network administration teams are typically responsible for ensuring that these applications and services are accessible from all their user locations with acceptable network connectivity performance, to meet their application and end user needs. A solution is needed to allow customer to monitor reachability and network connectivity performance for their applications from their actual user locations, office premises, specific cloud subnets that need access to their applications etc.

From a network management standpoint, two dimensions may be considered. A first dimension includes proactive network performance planning. In particular, to be able to support high quality end user experience, network needs to perform in tune with application expectations. For instance, real-time voice/video apps typically require the network to support low latency (e.g., <200 ms) and low jitter (e.g., <30 ms) characteristics, while bulk transfer apps are typically more tolerant of higher network latency. So, it is important for network architects and administrators to understand the network performance expectations of their most demanding applications, and plan for it proactively (e.g., choose the right kind of last mile connectivity option, plan deployment of cloud resources taking into account performance characteristics such as inter-region latency etc.). Likewise, even post deployment, network admins need to have the ability to get alerted on potential network issues (based on metric thresholds perhaps), before those issues start impacting operations. In either case, the ability to measure network performance becomes a basic prerequisite.

A second dimension includes reactive troubleshooting. When customers run into any application reachability or performance issues, they need to be able to quickly figure out if the issue is at the network-end or the application-end. If the issue is at the network-end, they need to know where in the network path it lies, and the best way to address it. To that end, customers today may be constrained by a lack of clear visibility into the path taken by the traffic between users and apps, and a lack of convenient tools to measure network performance.

Embodiments of the present disclosure can address the above challenges. In particular, a solution is disclosed, where the solution involves application-centric network connectivity monitoring service (referred to herein as a central monitoring service) that allows a CSP to present network connectivity insights for each application/endpoint of interest in a manner that lends itself to easier correlation between application performance and network connectivity performance, quicker isolation of problem domain: app v/s network and in turn specific area within network, and faster resolution of network issues with action recommendations provided by the service, whenever feasible.

Generally, "Endpoint Connectivity Tests" are implemented to support the ability to monitor connectivity to applications or any other endpoints. The central monitoring service service can be a multi-tenant service available to different customers and includes a frontend and a backend.

As far as the frontend, the central monitoring service supports an interface (e.g., a user interface (UI) or an application programming interface (API)) that provides different client functionalities. These functionalities enable the customer, among other things, to identify a destination to be tested (e.g., an application executed by a compute instance in the customer's private cloud, an endpoint such as the compute instance itself, a set of applications/compute instances hosted in a region, etc.). The customer can also identify the vantage points from which the destination is to be accessible (e.g., the geographical regions from which traffic to the destination can flow, an on-premises network of the customer that can access the destination hosted in the private cloud, a subnet of the customer that can access the destination, etc.). The customer can also identify the type of testing (e.g., determine whether a network location issue exists, determine whether a network layer issue exists, test for latency, test for jitter, etc.). The customer can also see the sources (sources are further described herein below) that are performing the tests, the network locations of these sources, their status (e.g., active, offline, etc.), the test reports, and the results of the tests. The customer can also change the deployment (e.g., add new source, remove source) and the status of sources (e.g., activate, deactivate a deployed source).

The central service collects and process test data from the different sources, and then output, via the interface such test data and/or the result of the processing (e.g., identifies a network location experiencing an issue, identifies the issue (e.g., high latency, packets being dropped, etc.), and/or identifies the network layer at which the issue occurs (e.g., layer 3, layer 4, layer 7 issue).

As far as the backend, the customer's input regarding the destination and the vantage points (and possibly other parameters described herein) is received. The service deploys sources to different network locations. Each source acts as an agent that sends probes (e.g., synthetic/simulated traffic) to the destination. When the source resides in the cloud infrastructure, it can be deployed as a virtual network interface card (VNIC) hosted by a network virtualization device (NVD). This VNIC is configured to only send probes to the destination, perform measurements on the responses to the probes, provides a heartbeat to the central service, and sends test data (e.g., the measurement results) to the central service. When the source resides outside the cloud infrastructure (e.g., on an on-premises network of the customer), the central service provides a software package to the customer that then installs it as an-onpremise source. The functionality may be the same in terms of probing, heartbeating, and reporting.

Multiple functionalities that can be supported by the source and the central monitoring service for the testing. Among these functionalities are correlation and triangulation. As far as correlation, the testing by a single source can be sufficient. For example, the probing from a first source to the destination is sufficient. Nonetheless, it is possible to correlate or confirm the testing by one source by using the test results of a second source.

The source can send probes of different types (e.g., each probe can be data sent according to a particular protocol). The different types correspond to different network layers (e.g., Layer 3, Layer 4, Layer 7). For example, the source sends ICMP probes, TCP probes, UDP probes, HTTP probes, etc. The source then waits for a response from the destination to each probe to perform a measurement on the response. If a response is not received, that indicates a failure, additional probes are sent at a higher cadence to confirm the failure before the failure is declared. If a response is received, a particular measurement is performed (e.g., latency, jitter, etc.). The type of measurements can depend on the type of the destination (e.g., if the destination provides a video service, latency and jitter are measured; in comparison, if the destination provides a data replication service, only jitter is measured). The measurement per probe type (including the failure if that is the case) are reported to the central service.

The different probe types can be sent in parallel or sequentially. Or the source can send one type of probes and, if an issue is identified, the source can send another type of probing to further identify the issue (e.g., the source can start with HTTP probes and, if a failure is detected, can then send ICMP probes to confirm if the issue is a layer 3 issue or a layer 7 issue).

The central monitoring service then correlates the measurements across the probe types to determine the type of issue (e.g., the specific network layer having the issue). For example, if the HTTP probing indicates a failure or high latency/jitter, but ICMP probing shows no failures or normal operations, the central monitoring service determines that a layer 7 issue exists (e.g., issue at the application level at the destination) instead of a layer 3 issue (e.g., no connectivity issue between the source and the destination).

As far as triangulation, at least two sources are used. Each source sends probes to the destination, performs measurements, and reports to the central service. The central monitoring service correlates the measurements from the sources to determine a network location where the issue occurs.

The triangulation can be combined with the correlation to determine not only the network location experiencing the issue, but the network layer at the network location that is causing the issue. In addition, the probe testing (e.g., the use of synthetic/simulated traffic) can be combined with the use of actual client traffic. For example, if client traffic is reported to be failing from a region, a source can be deployed to the region, whereas another source can be deployed to another region. Here, the two sources are activated for triangulation (and possibly other sources). The testing that they can perform can depend on the client traffic issue (e.g., if the client traffic indicates that there is no connectivity, ICMP probing can be performed. If the client traffic indicates high latency, HTTP probing can be performed). In another example, the actual client traffic can be initiated from a computing resource of the customer (e.g., a compute instance in a VCN subnet or a node in its on-premises network). A source can be deployed to such computing resource and as a software package that, when installed and executed, configures the computing resource to perform measurements based on responses (or lack thereof) of the destination to the traffic and report test metrics to the central monitoring service.

FIG. 1 illustrates an example computer environment that enables monitoring of reachability or network connectivity, according to certain embodiments. The computer environment includes a computer system 110 of a CSP, a number of networks at which sources can be deployed, a virtual cloud network 150 hosting possible destinations for a customer of the CSP, and a device 190 operable by the customer. The computer system 110 can be implemented as a set computing resources (hardware resources or virtualized resources) and can host a central monitoring service 112 (e.g., a multi-tenant service). Input 192 of the customer can be received by the central monitoring service 112. In turn, the monitoring service 112 can deploy sources for probing one or more destinations of the customer within the virtual cloud network 150, receive probe data back, and output test data 114 to the device 190 (or any device of the customer) for presentation threat.

In an example, the input 192 at least indicates a destination 152 and a set of vantage points. Other parameters are also possible, as further described in the next figures. The destination 152 can be a Layer 3 destination (e.g., an IP address of a compute instance), a Layer 4 destination (e.g., a TCP, UDP, DCCP, or SCTP endpoint), a Layer 7 destination (e.g., an application), or any other types of destination (e.g., a Layer 2 destination). Each vantage point can represent a geographic location or a network location from which traffic to the destination 152 is expected, planned, or already occurring.

For illustrative purposes, the destination 152 is illustrated as being included in the virtual cloud network 150. However, the embodiments are not limited as such and instead similarly and equivalently apply to any destination type. For example, the destination can be a virtualized or a hardware computing resource in a public network or a private network (including possibly on customer-premises, on third party cloud) or may be a standalone computing resource (e.g., one reachable via the Internet).

The central monitoring service 112 can maintain a mapping of vantage points to possible networks at which sources can be deployed. For example, if the input 192 indicates a geographic region, the central monitoring service 112 can determine, from the mapping, that the geographic region contains a network available for a source deployment. Not all deployments may need a mapping. For example, if the input 192 indicates an on-premises network 130 of the customer, the central monitoring service 112 may merely provide a software package that can be installed in a computing resource of the on-premises network 130. Similarly, if the input 192 indicates another network (e.g., another VCN or a VCN subnet) or a VCN subnet within the virtual cloud network 150, the central monitoring service 112 may send a software package to that network or, as the case may be, launch a VNIC in the applicable VCN or VCN subnet, where the VNIC provides the functionalities of the source.

In the illustrative example of FIG. 1, three sources are shown as being deployed in three networks corresponding to three vantage points. However, the embodiments are not limited as such and can include any number of sources (e.g., including more than one source per network), any number of networks (e.g., including multiple networks of the same type), and any number and type of vantage points.

As illustrated, a source 122 is deployed in another virtual cloud network 120 of the customer. A source 132 is also deployed in an on-premises network 130 of the customer. A third source 142 is deployed in a network 140 that is within a geographic region indicated in the input 192 and corresponding to an expected location from which traffic over the Internet may be sent or exchanged with the destination 152. This source 142 can be in a particular tenancy within a virtual network managed by the CSP.

Although not illustrated in FIG. 1, the central monitoring service 112 can configure, via a configuration file, an existing computing resource of the customer (e.g., a compute instance within the virtual cloud network 120) to act as a source. This computing resource can send to and/or receive traffic from the destination 152. The configuration can be via a configuration file and need not alter the behavior of the computing resource towards the destination 152 (e.g., the computing resource can continue exchanging traffic with the destination 152 and need not send probes thereto, where the probes would represent synthetic traffic or test data traffic). Instead, the computing resource may be configured to perform test measurements and report such measurements to the central monitoring service 112, similar to the measurement and reporting by the other sources.

Each of the deployed sources 122, 132, and 142, sends probes to the destination 152. Given that different vantage points are used, the probes sent by one of the sources follows a different network path than those sent by another source. In particular, probes 124 sent by the source 122 to the destination 152 follow a first network path. Probes 134 sent by the source 132 to the destination 152 follow a second network path. And probes 144 sent by the source 142 to the destination 152 follow a third network path. There may be an overlap between any of the network paths, but the overlap is merely partial (e.g., two network paths differ by at least one network hop).

Each of the sources 122, 132, and 142 monitors responses of the destination 152 to its probes (or the lack of responses) and performs measurements on the responses. The measurements can be indicated in the input 192, and/or can depend on the probe types and/or the destination 152. For example, if the destination 152 is a video application and if the input indicates that Layer 3 and Layer 7 measurements are to be made, the source can measure a response time and jitter. Based on its measurements, each source can generate test metrics and report such test metrics to the central monitoring service 112. Additionally, or alternatively, each source can be configured to identify a possible connectivity or reachability issue (e.g., whether one exists and the likely network layer at which it exists) and report such an issue to the central monitoring service. As such, probe data can be reported to the central monitoring service 112 and can include any or both of the test metrics and identified possible connectivity or reachability issue(s). In the illustration of FIG. 1, the source 122 sends probe data 126 to the central monitoring service 112, where the probe data 126 corresponds to the probes 124. Similarly, the source 132 sends probe data 136 to the central monitoring service 112, where the probe data 136 corresponds to the probes 134. And the source 142 sends probe data 146 to the central monitoring service 112, where the probe data 146 corresponds to the probes 144.

The central monitoring service 112 analyzes the received probe data using different techniques. One technique involves correlation across the different types of probes. For example, the probe data 126 received from the source 122 corresponds to the probes 124, and these probes are of different types (e.g., Layer 3 probes, Layer 4 probes, and Layer 7 probes). If a connectivity and reachability issue is suspected and determined, the network layer at which it exists can be determined by examining the test metrics corresponding to each probe type. For instance, if Layer 3 and Layer 4 probes indicates no issue, but Layer 7 probes indicate an issue, then the issue exists at network Layer 7. Further, the correlation can be across the probe data of two or more sources. For instance, assume that all only probe data 126 indicates a Layer 3 issue, but the probe data 136 and 146 indicate no issue, the issue is likely a network layer 3 issue along the first network path. In comparison, assume that probe data 126 indicates a Layer 7 issue, but the probe data 136 and 146 indicate no issue, the issue is likely a network layer 7 issue associated with an application session. As explained herein above, the correlation across the types of probes sent by one source can be performed at the source itself in addition to or in lieu of being performed at the central monitoring service 112.

Another technique involves triangulation. Here, the triangulation typically involves the probe data of two or more sources to identify a network location at which a reachability or network connectivity issue is suspected or exists. Typically, triangulation is implemented at the central monitoring service 112. Nonetheless, it may be possible to implement it at a source if such a source receives the probe data of one or more other sources. The triangulation generally involves comparing the network paths of the different probes to identify a common portion of the network paths and a non-overlapping portion. If the issue is observed given probes of two or more sources, then the network location is along the common portion of the network paths between these sources and the destination 152. If the issue is observed given probes of one source only, then the network location is along the non-overlapping portion of the network path between that source and the destination 152.

In addition to deploying sources and receiving probe data therefrom, the central monitoring service 112 can be configured to control and receive feedback from the sources. For example, the monitoring service 112 can de-activate a deployed source, can remove a deployed source from deployment, and/or can instruct a deployed source about the probe types to use, the sequence of probe types to use (e.g., start with Layer 7 probes; if no issue seen, send Layer 4 probes, and so on. Or send probes of the different types in parallel or in a random order), the type of measurements to make, and/or the cadence of probing. Such control can be dynamic depending on any reachability or connectivity issue that the central monitoring service 112 determines and/or based on additional input from the device 190. Feedback of a source can include a heartbeat, its current status, probe data logs that it has collected over time, etc.

The central monitoring service 112 can send the test data 114 to the device 190 for presentation at an interface (e.g., a GUI) thereat. The test data 114 can indicate any reachability or network connectivity issue suspected or determined, a network location thereof, and/or a network layer thereof. The test data 114 can also include other data, such as the actual test metrics, raw measurements, network locations of the deployed sources, status of each source, etc.

Figure 2:
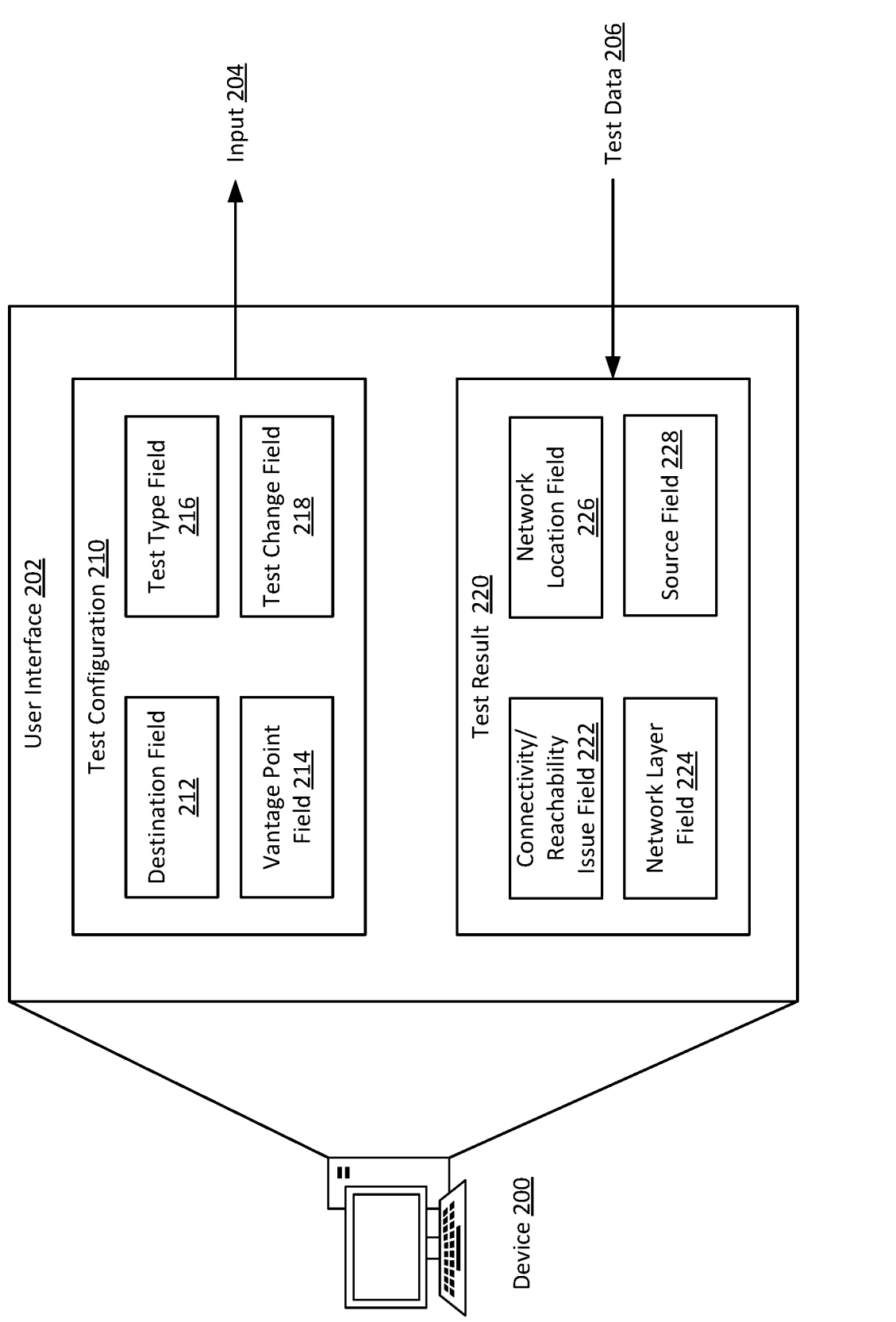
FIG. 2 illustrates an example user interface associated with monitoring of reachability or network connectivity, according to certain embodiments.

FIG. 2 illustrates an example user interface 202 associated with monitoring of reachability or network connectivity, according to certain embodiments. The user interface 202 is an example of the GUI described herein above and can be presented by a device 200, which is an example of the device 190. Generally, the user interface 202 allows input of a customer to be received to define parameters for a test configuration 210. The defined values of the parameters can be included in input provided to a central monitoring service (e.g., the input 192 provided to the central monitoring service 112). The user interface 202 also allows a presentation of a test result 220, which can be a visualization of test data 206 received from the central monitoring service based on the input 204 (e.g., the test data 114).

In the illustrative example of FIG. 2, different fields are available at the user interface 202 to define the test configuration 210. For instance, a destination field 212 can be used to define a set of destinations to be tested. A vantage point field 214 can also be available to define a set of vantage points. A test type field 216 can be used to define the type of testing to be performed (e.g., Layer 3 testing, Layer 4 testing, Layer 7 testing) and/or parameters of the testing (e.g., response time, jitter, measurement thresholds, etc.). A test change field 218 can be used to modify aspects of the testing, such as to activate and/or deactivate a source. The input to any of these fields can follow a structured format (e.g., each field provides a drop down menu from which available selection(s) is(are) possible). Additionally, or alternatively, each field can support unstructured text input (e.g., natural language input) that can then be processed by a machine learning model of the central monitoring service to identify the relevant value(s).

Similarly, different fields are available at the user interface 202 to present the test result 220. The presentation can follow any format (e.g., text, graphics, plots, animations, interactive, etc.). A connectivity/reachability issues field 222 can indicate the type of issue observed for a destination (e.g., not reachable, reachable but slow connection, etc.). A network layer fields 224 can indicate the network layer at which the issue occurs (e.g., Layer 3, Layer 4, Layer 7). A network location field 226 can indicate a network location where the issue occurs (e.g., a particular hop or node along a network path, the destination, a gateway, a router, etc.). A source field 228 can identify the source(s) that have been deployed and their statuses. Any or all these fields can be expanded. For example, a source identified in the source field 228 can be selected. The selection can result in presenting the test metrics, the types of probes, the number of probes, the probing log, or any other information related to the probing that the source has been executing.

Figure 3:
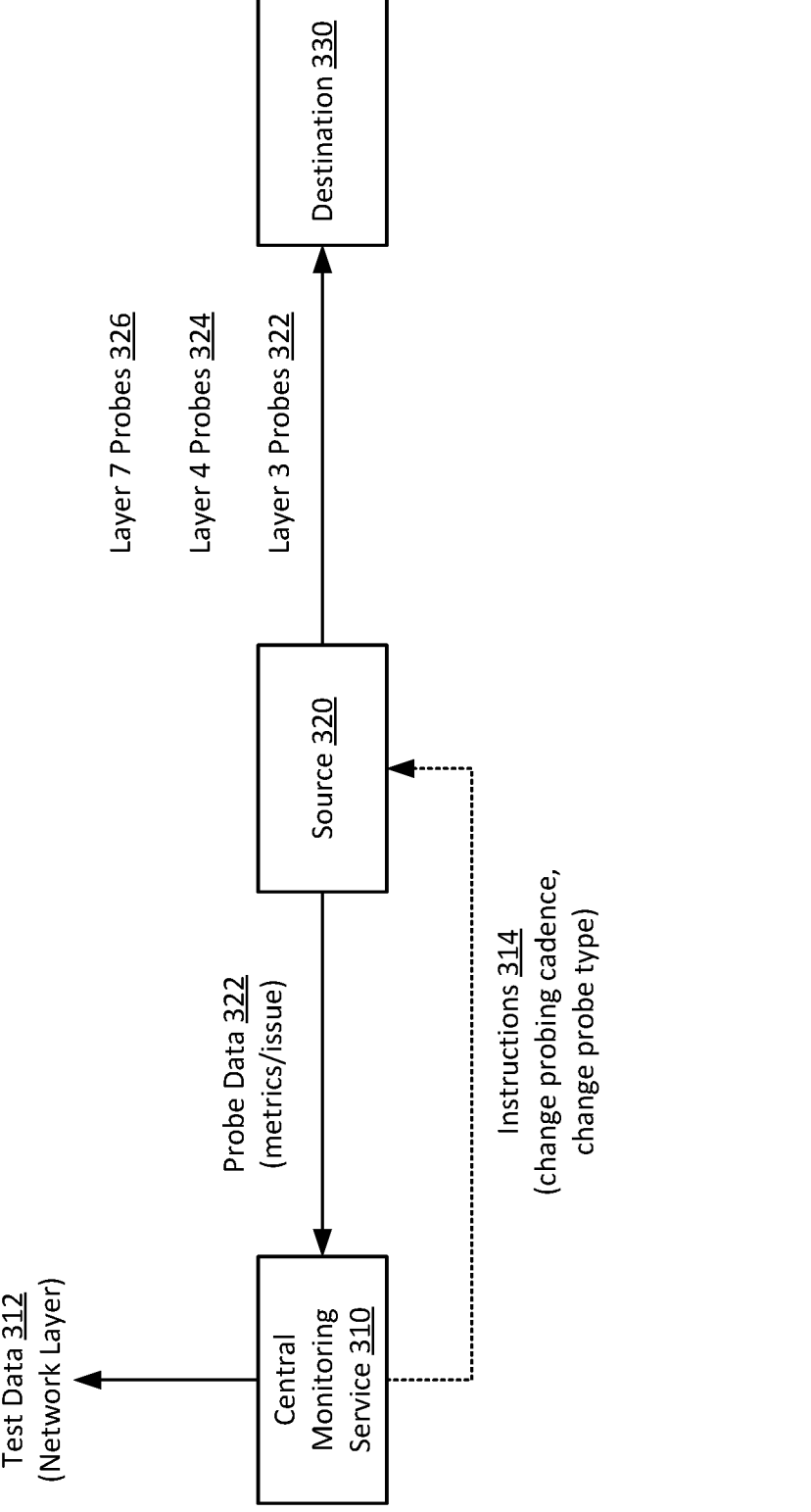
FIG. 3 illustrates an example of network layer monitoring using multiple types of probes, according to certain embodiments.

FIG. 3 illustrates an example of network layer monitoring using multiple types of probes, according to certain embodiments. Here, the probes of different types are used for correlation. A central monitoring service 310 may have deployed a source 320 to probe a destination 330 (or, similarly, configured an existing computing resource to report probe data based on measurements that the computing resources performs on actual traffic with the destination 330). The central monitoring service 310 is an example of the central monitoring service 110. The deployment can be based on input received via an interface to the central monitoring service 310, such as the input 204.

The central monitoring service 310 can instruct, or can configure by default, the source 320 to send probes of different types to the destination 330. Here, three types of probes are illustrated and include layer 3 probes 322, layer 4 probes 324, and layer 7 probes, although a different number of types, different types are possible, and different types within a same network layer are possible. Accordingly, the source 320 sends the layer 3 probes 322, layer 4 probes 324, and layer 7 probes to the destination 330, monitors responses (or lack thereof), and performs measurements to report probe data 322 to the central monitoring service 310.

In an example, upon generating a test measurement, the source 320 reports it immediately to central monitoring service 310 as the probe data 322. In another example, upon generating test measurements over a period of time, the source 320 reports them (or a test metric derived from them) to central monitoring service 310 as the probe data 322. In yet another example, the source 320 can log the probe data 322 and report it on-demand to the central monitoring service 310. The frequency and type of reporting can be part of the configuration of the source 320 or any control instructions thereto from the central monitoring service 310. Additionally, the type(s) of measurements and/or whether the reporting should include raw measurements, metrics derived therefrom, or any identified issue can be configured or instructed.

In an example, the central monitoring service 310 may receive first probe data from the source 320 including a test measurement, a test metric, or an identification of a potential issue. Rather than declaring an issue, the central monitoring service 310 may wait and process further probe data over a period of time to confirm the issue before declaring it. If such subsequent probe data indicates persistence of the issue, then the issue is declared. Otherwise, the issue may be dismissed.

As illustrated with the dotted arrow, the central monitoring service 310 can send instructions 314 to the source 320 to control aspects of the probing or measurements. For example, the instructions 314 can change the probing cadence (e.g., increase the rate of probes sent if a potential issue is identified). The instructions 314 can also change the probe type (e.g., if layer 7 probes are used first and a potential issue is determined, the instructions 314 can request the source to send layer 4 probes). Other controls are possible. For example, the central monitoring service 310 can initially instruct or configure by default the source 320 to send all types of probes. When a potential issue is identified, the central monitoring service 310 instruct the source 320 to send one particular types of probes or use a particular sequence for probing the destination 330 using more than one probe type.

Figure 4:
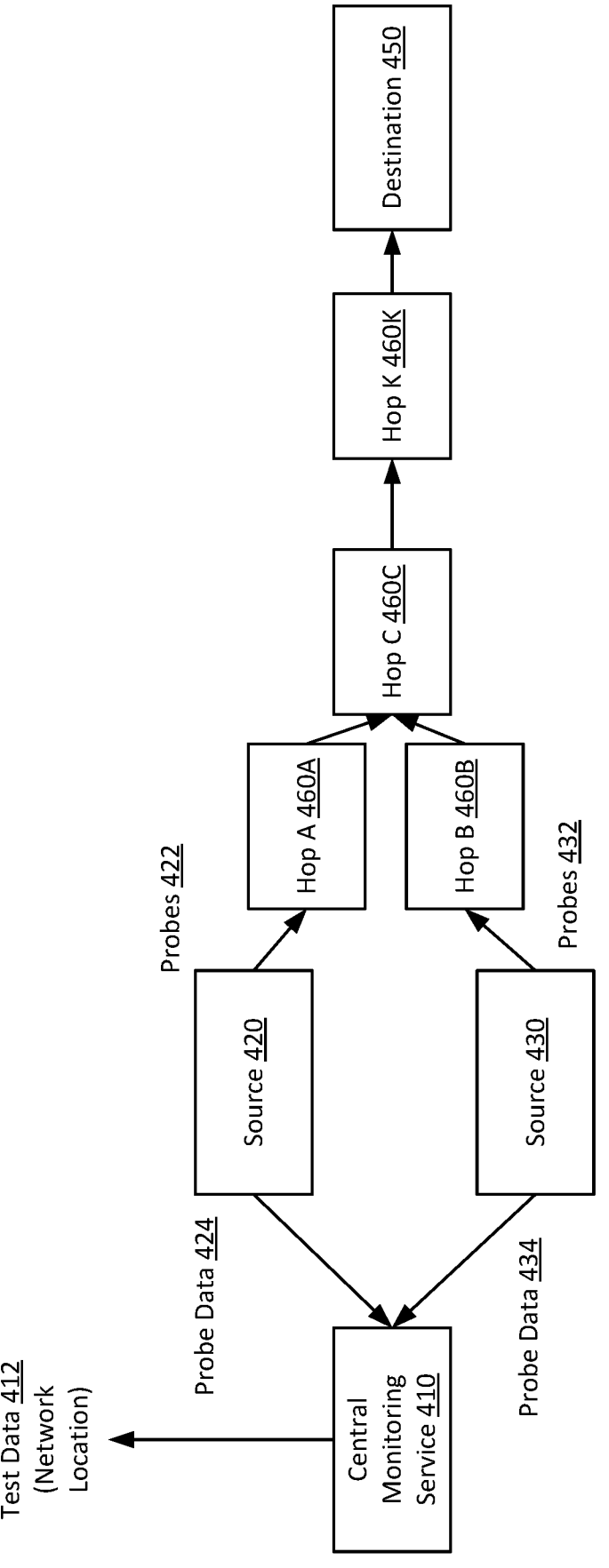
FIG. 4 illustrates an example of network location monitoring using multiple sources, according to certain embodiments.

FIG. 4 illustrates an example of network location monitoring using multiple sources, according to certain embodiments. Here, the probes from different sources are used for triangulation. A central monitoring service 410 may have deployed a first source 420 and a second source 430 to probe a destination 450. It is possible that one of such sources is an existing computing resource that the central monitoring service 410 configures to report probe data based on measurements that the computing resources performs on actual traffic with the destination 450. The central monitoring service 410 is an example of the central monitoring service 110. The deployment can be based on input received via an interface to the central monitoring service 410, such as the input 204 of FIG. 2.

A first network path can exist between the first source 420 and the destination 450. This network path may include hop A 460A, Hop C 460C, and so on, until hop K 460K and the destination 450. Similarly, a second network path can exist between the second source 430 and the destination 450. This network path may include hop B 460B, Hop C 460C, and so on, until hop K 460K and the destination 450. The central monitoring service 410 can determine the first network path and the second network path using different techniques including, for example, trace routing. Alternatively, each of the sources 420 and 430 can determine its network path (e.g., using tracing routing) and report this network path to the central monitoring service 410.

In the illustration of FIG. 4, the first network path and the second network path have a common portion and non-overlapping portions. The common portion includes the hop C 460C through the hop K 460K. As far as the non-overlapping portions, the non-overlapping portion of the first network path includes hop A 460A, whereas that of the second network path includes hop B 460B.

In an example, the central monitoring service 410 causes (e.g., by instructing or configuring as described in FIG. 3) the first source 420 to send first probes 422 to the destination 450 along the first network path and to report the resulting first probe data 424 back to the central monitoring service 410. Similarly, the central monitoring service 410 causes (e.g., by instructing or configuring as described in FIG. 3) the second source 430 to send second probes 432 to the destination 450 along the second network path and to report the resulting probe data 434 back to the central monitoring service 410.

If a reachability or network connectivity issue exists, the network location (e.g., any of the hops or the destination or a portion of a network path) of that issue can be determined by analyzing the two sets of probe data 424 and 434. Of course, this analysis can also be used in conjunction with correlation across probe types for probe data received from one the sources or from both sources. Generally, if the issue is indicated by sets of probe data 424 and 434, its network location is along the common portion of the path. If the issue is indicated by only the first probe data 424, its network location is along the non-overlapping portion of the first network path. In comparison, if the issue is indicated by only the second probe data 434, its network location is along the non-overlapping portion of the second network path. Now if a network path portion is identified to be associated with the issue and includes more than one hop (or a hop and the destination 450), additional triangulation techniques can be used to narrow that portion to possibly one hop or the destination 450 itself as the case may be. Such techniques are further described in the next figures.

To illustrate, say that the first source 420 and the second source 430 send the first probes 422 and the second probes 432, respectively to the destination 450 and report failures (e.g., no response to the probes). Then the central monitoring service 410 determines that the location of the reachability or network connectivity issue is possibly the destination 450. This determination can be further confirmed by probing the hops or using an additional source as further described herein below. In another illustration, say that the first source 420 reports a failure, but the second source 430 reports normal operations. The central monitoring service 410 can then determine that the reachability or network connectivity issue it not at the destination 450. Instead, the issue is along the first network path between the first source 420 and the destination 450. Given that there is no issue reported by the second source 430, the central monitoring service 410 determines that the reachability or network connectivity issue cannot be along the common network path (e.g., is not between the hop C 460C and the destination 450). Instead, it is at the portion of the first network path between the first source 420 and where the common network path starts (e.g., is at the hop A 460A). Information about the specific network location of the issue (e.g., IP address, hop identifier, etc.) can be included in test data 412 that is presented at an interface (e.g., the test data 206 of FIG. 2).

Figure 5:
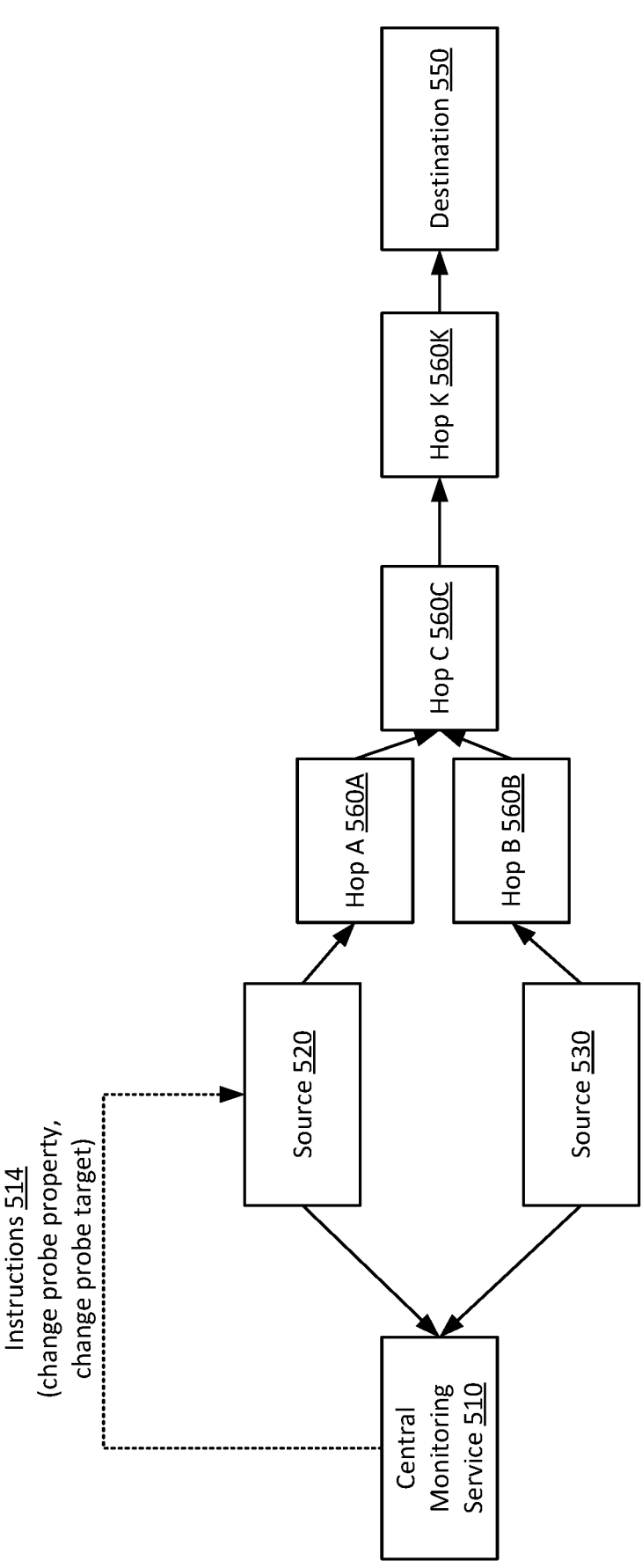
FIG. 5 illustrates another example of network location monitoring using multiple sources, according to certain embodiments.

FIG. 5 illustrates another example of network location monitoring using multiple sources, according to certain embodiments. Here, a similar network environment as the one of FIG. 4 is described and includes a central monitoring service 510, a first source 520, a second source 530, a hop A 560A, a hop B 560B, a hop C 560C, and so on until a hop K 560K, and a destination 550. In the interest of brevity, the similarities are not repeated herein. Assume that a reach-ability or network connectivity issue is suspected or deter-mined to be along a portion of network path that includes more than one hop or a hop and the destination 550. In the illustrative example of FIG. 5, that portion would be the common portion that includes the hop C 560C, the hop K 560K, and the destination 550. Different techniques can be used to determine the specific network location where this reachability or network connectivity issue may exist.

In one example, correlation can be used. For instance, if probing using layer 3 probes indicates no failures, but probing using layer 7 probes indicates a failure, the desti-nation 550 can be determined to be the network location of the issue (in addition to the issue being a layer 7 issue).

In another example, the central monitoring service 510 can, after the issue being suspected or determined, dynami-cally (or based on input via an interface, such as the user interface 202) generate and send instructions to one or both sources 520 and 530 to change parameters of the probing. In the illustrative example of FIG. 5, instructions 514 sent to the first source 520 are shown. For instance, the instructions can change a probe property of the probes sent by the source 520. The probe property can be a time to live attribute. In particular, the instructions can gradually increase the time to live attribute until the network location is identified. For instance, the first source 520 sends a probe with a small time to live attribute such that the probe reaches the start of the network portion where the issue exists (e.g., hop C 560C in the illustrative example of FIG. 5) and expires thereafter. If this probing indicates the failure, then that starting hop (e.g., the hop C 560C) is determined to be the network location experiencing the issue. Otherwise, the central monitoring service 510 can instruct the first source 520 to send another probe with a longer time to live attribute such that the probe reaches the next hop along the network portion and expires thereafter, and so on.

Additionally, or alternatively, the instructions 514 can change a probe target. Here, rather than probing the desti-nation 550, the starting hop (e.g., the hop C 560C) can be probed first instead of the network destination 550. If this probing indicates the failure, then that starting hop (e.g., the hop C 560C) is determined to be the network location experiencing the issue. Otherwise, the central monitoring service 510 can instruct the first source 520 to probe, instead of the destination 550, the next hop along the network portion and expires thereafter, and so on.

Figure 6:
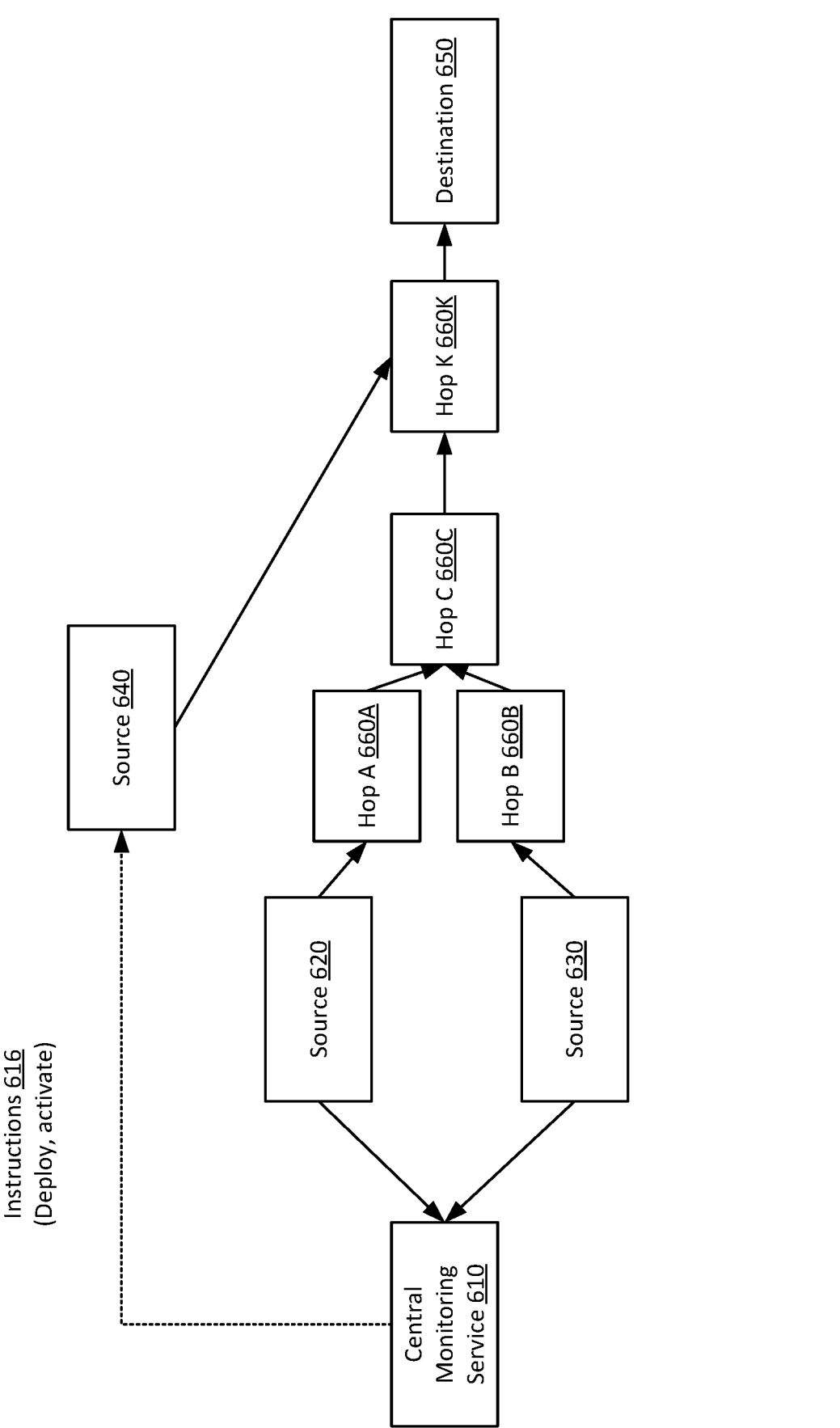
FIG. 6 illustrates yet another example of network location monitoring using multiple sources, according to certain embodiments.

FIG. 6 illustrates yet another example of network location monitoring using multiple sources, according to certain embodiments. Here, a similar network environment as the one of FIG. 4 is described and includes a central monitoring service 610, a first source 620, a second source 630, a hop A 660A, a hop B 660B, a hop C 660C, and so on until a hop K 660K, and a destination 650. In the interest of brevity, the similarities are not repeated herein. Assume that a reachability or network connectivity issue is suspected or determined to be along a portion of network path that includes more than one hop or a hop and the destination 650. In the illustrative example of FIG. 6, that portion would be the common portion that includes the hop C 660C, the hop K 660K, and the destination 650. Different techniques (including the ones described in FIG. 5) can be used to determine the specific network location where this reachability or network connectivity issue may exist.

In another example of these techniques, and as described in FIG. 6, the central monitoring service 610 can, after the issue being suspected or determined, dynamically (or based on input via an interface, such as the user interface 202) generate and send instructions 616 to a third source 640 to also probe the destination. Here, the third source 640 can correspond to a different vantage point than that of the first source 620 and 630 can be deployed, configured, or otherwise activated (e.g., if previously deployed and deactivated). A third network path exists between the source 640 and the destination 650, where this network path only partially overlaps with the common network path where the issue may have been suspected. In the illustration of FIG. 6, the third network path includes hop K 660K and the destination 650 but excludes the hop C 660C. As such, by probing the destination 650 from the third source 640, if the issue is not observed, then the hop C 660 (which is not part of the third network path) is the network location of the issue. Otherwise, the common portion between the third network path and the other two networks path includes the location of the issue.

As needed, more than one additional source can be instructed to probe the destination 650. The number of such source can depend on how big the network portion where the issue exists is and the overlap between the different network paths. The central monitoring service 610 can determine the set of additional sources to instruct based on knowledge about the network paths (e.g., via trace routing) and the network portion where the issue exists (e.g., based on the triangulation performed so far).

Figure 7:
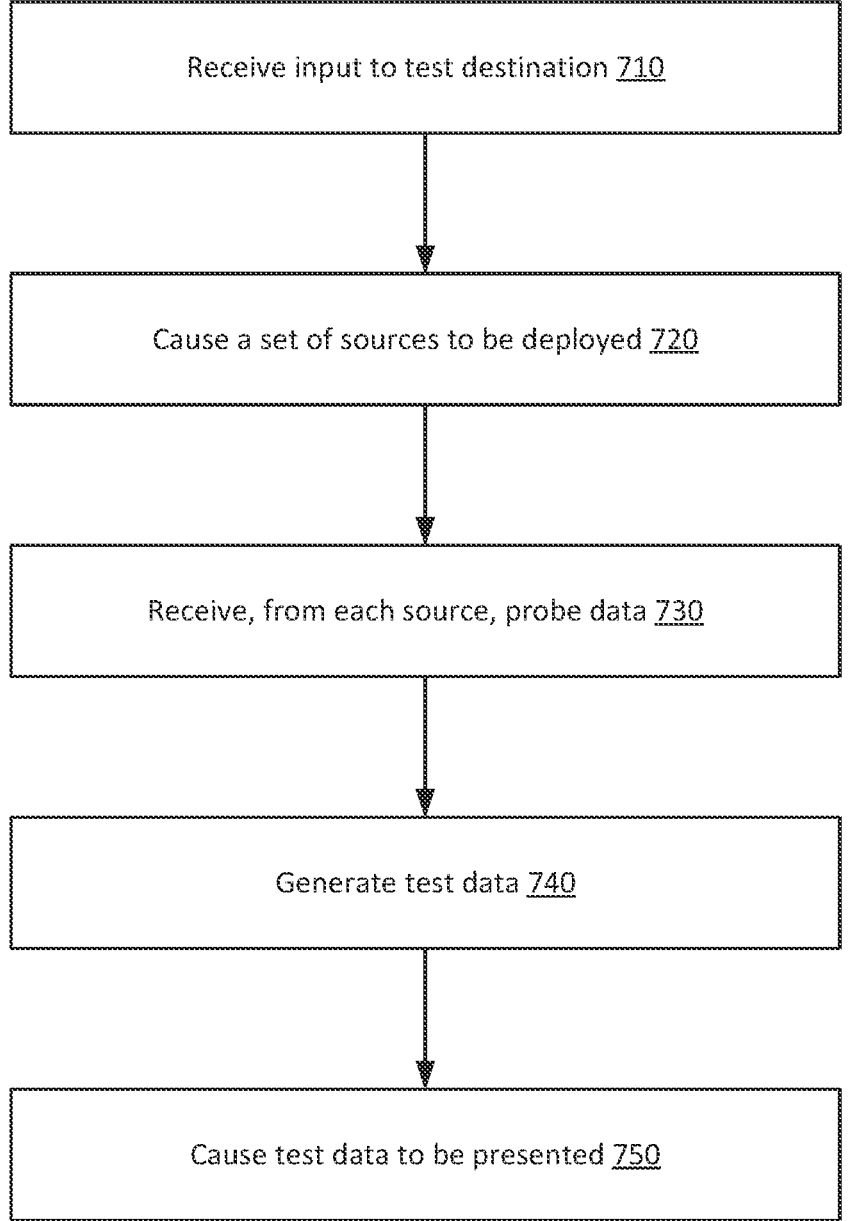
FIG. 7 illustrates an example flow for monitoring of reachability or network connectivity, according to some embodiments.

FIG. 7 illustrates an example flow for monitoring of reachability or network connectivity, according to some embodiments. Operations of the flows can be performed by a computer system hosting a central monitoring service, such as the computer system 110 hosting the central monitoring service 112 of FIG. 1. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes at step 710, the computer system receiving input to test a destination. For instance, the central monitoring service of the computer system, from a device of a customer, input indicating (i) a destination that belongs to a virtual cloud network of the customer and that is to be tested and (ii) a set of vantage points from which the destination is to be tested. A first vantage point of the set corresponds to at least one a geographical region from which traffic to the destination is expected, an on-premises network having access to the destination, or a virtual cloud network subnet. The input can be similar to the input 202 of FIG. 2.

In an example, the flow includes at step 720, the computer system causes a set of sources to be deployed. For instance, the central monitoring service of the computer system causes (e.g., instructs or configures), based on the input, a first source to be deployed to a first network location associated with the first vantage point and a second source to be deployed to a second network location associated with a second vantage point (e.g., by sending software packages and/or instantiating VNICs). The first source is configured to send first probes of different types to the destination (similar to the illustration of FIG. 3). Similarly, the second source is configured to send second probes to the destination.

In an example, the flow includes at step 730, the computer system receives, from each source, probe data. For instance, the central monitoring service of the computer system receives, from the first source, first probe data based on the first probes sent to the destination. The first probe data indicates a first test metric (or any other probing related data, such as an issue, raw measurements, etc.). Similarly, the central monitoring service of the computer system receives, from the second source, second probe data based on the second probes sent to the destination. Here also, the second probe data indicates a second test metric.

In an example, the flow includes at step 740, the computer system generates test data. For instance, the central monitoring service of the computer system generates the test data based on the first probe data and the second probe data. The test data indicates at least one of reachability or connectivity performance of the destination. The test data can be generated using correlation techniques, as described in FIG. 3 and/or triangulation techniques as described in FIGS. 4-6.

In an example, the flow includes at step 740, the computer system causes the test data to be presented. For instance, the central monitoring service of the computer system causes the test data to be presented at a user interface, such as the user interface 202 of FIG. 2 by sending the test data (e.g., such as the test data 206 of FIG. 2) to the device or any other device of the customer presenting the user interface.

C—Example Infrastructure

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
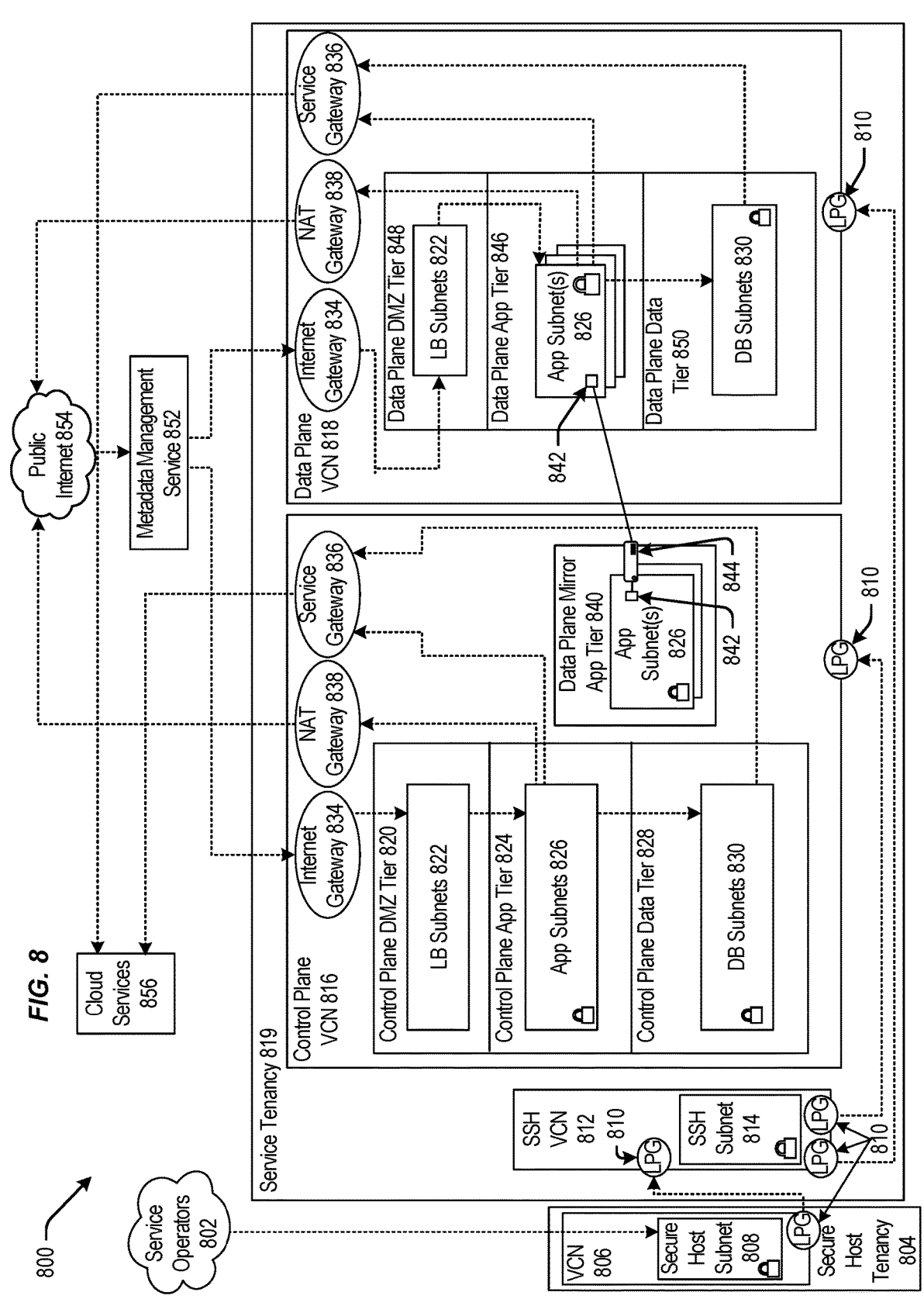
FIG. 8 is a block diagram illustrating one pattern for implementing a cloud infrastructure as a service system, according to certain embodiments.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry 8, Palm OS, and the like, and be Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as, for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. However, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
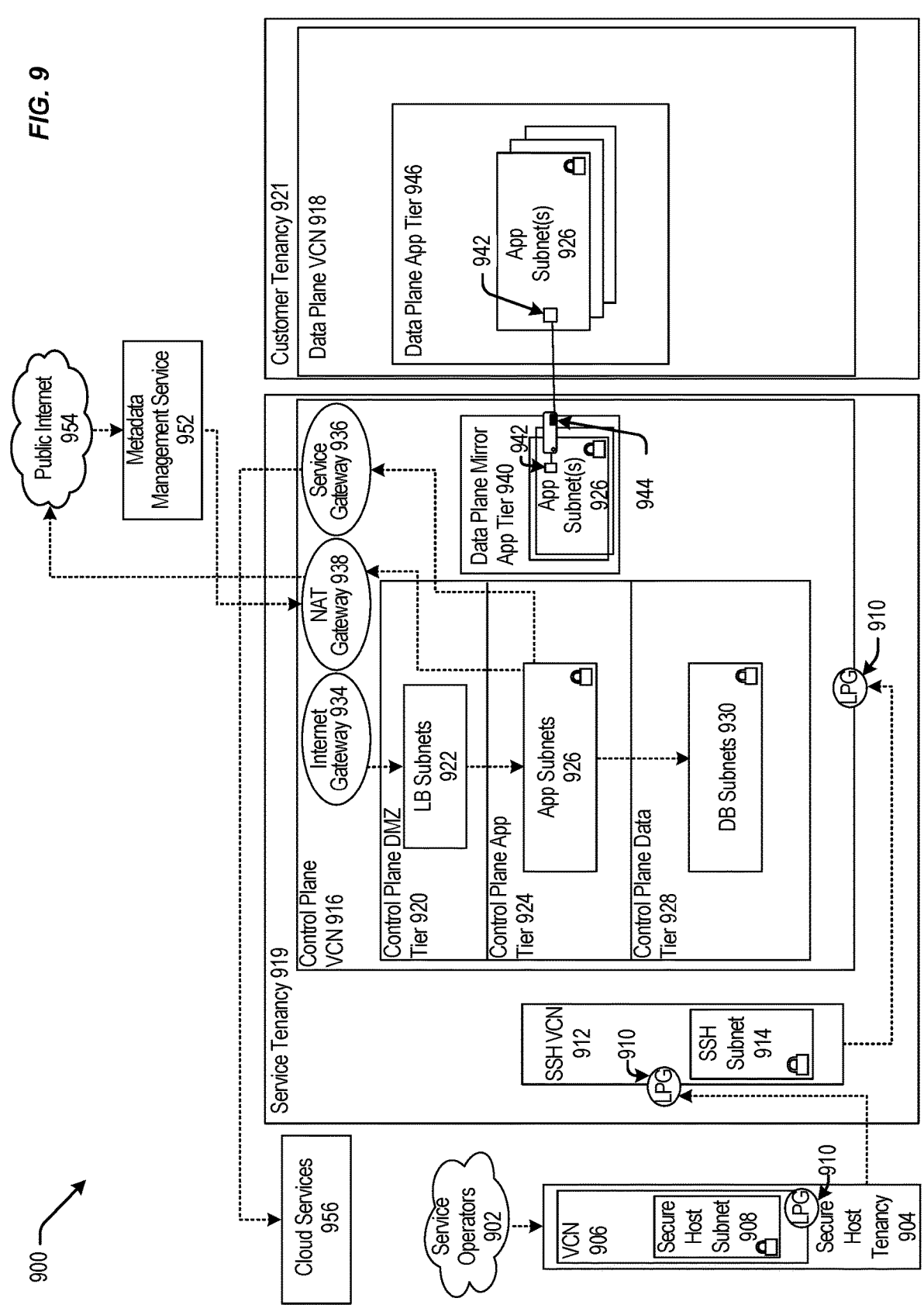
FIG. 9 is a block diagram illustrating another pattern for implementing a cloud infrastructure as a service system, according to certain embodiments.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG.

8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively coupled to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8" may be located in Region 1 and in Region 2. If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
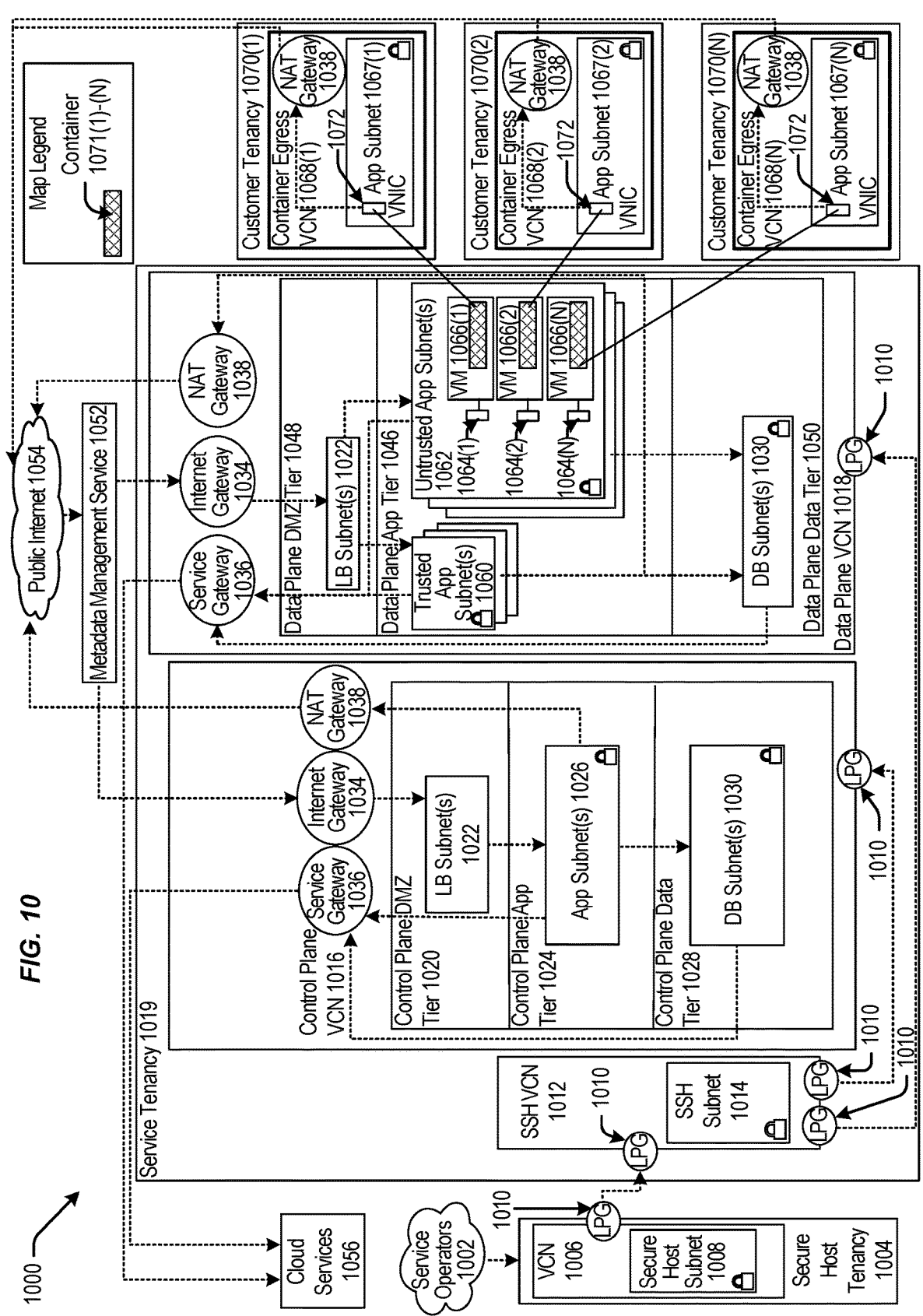
FIG. 10 is a block diagram illustrating another pattern for implementing a cloud infrastructure as a service system, according to certain embodiments.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024

(e.g., the control plane app tier 824 of FIG. 8) that can include app subnet(s) 1026 (e.g., similar to app subnet(s) 826 of FIG. 8), and a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case in which support may be desired when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VMs 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
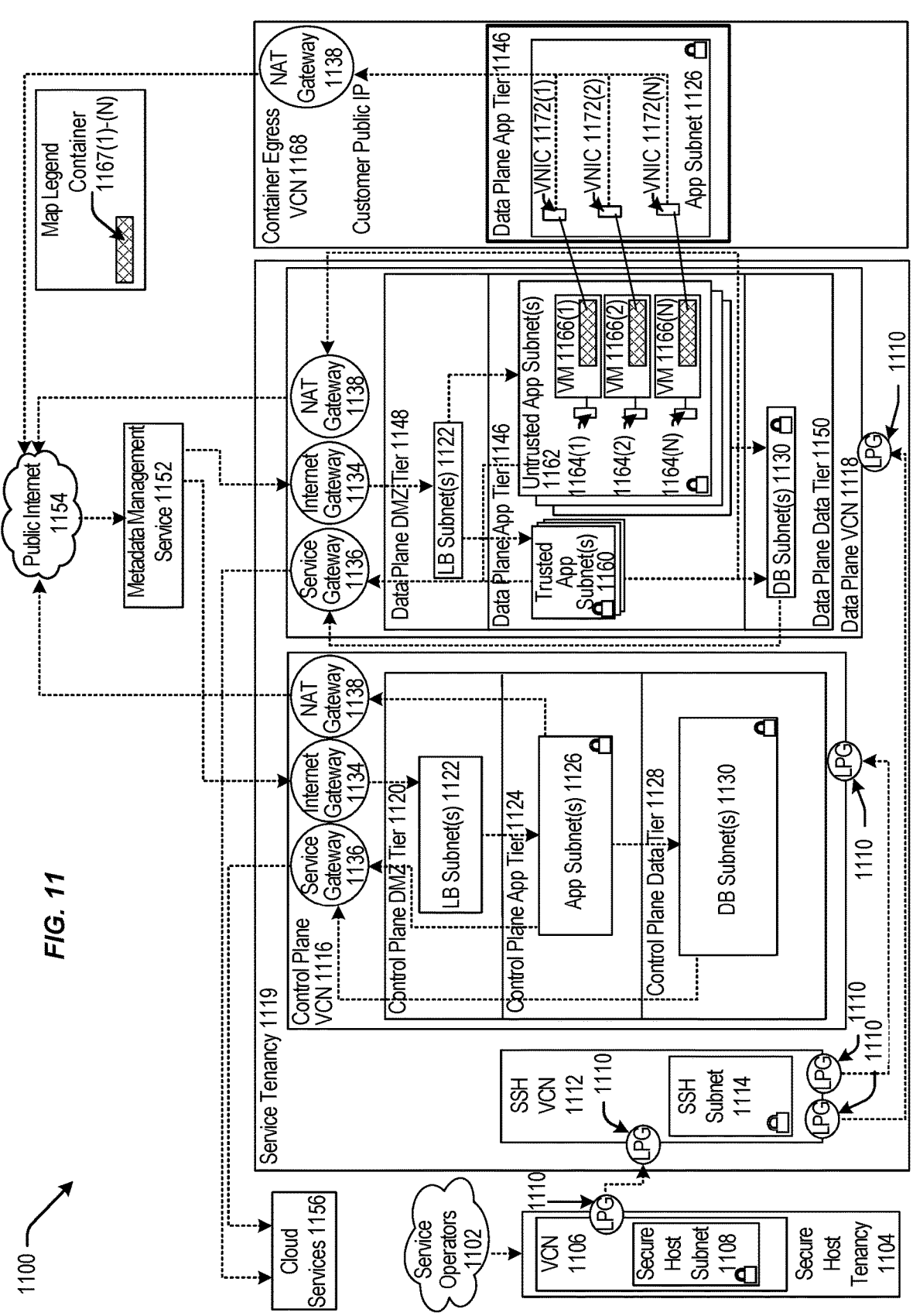
FIG. 11 is a block diagram illustrating another pattern for implementing a cloud infrastructure as a service system, according to certain embodiments.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
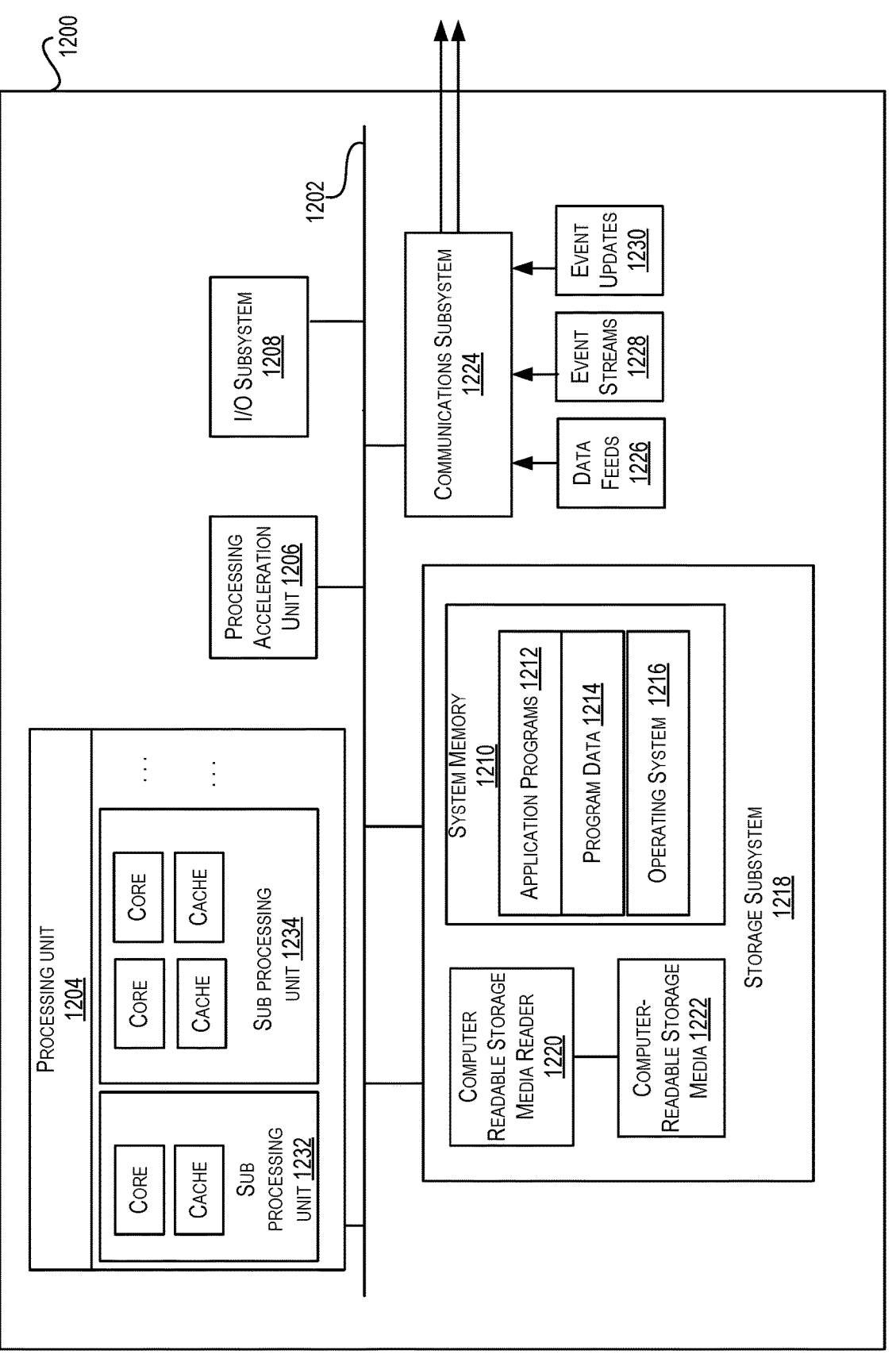
FIG. 12 is a block diagram illustrating an example computer system, according to certain embodiments.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, or medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that, when executed by a processor, provides the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head-mounted display), a PC, a workstation, a mainframe, a kiosk, a server rack, or any other data processing system.

In the foregoing description, for the purposes of explanation, specific details are set forth to provide a thorough understanding of examples of the disclosure. However, it will be apparent that various examples may be practiced without these specific details. The ensuing description provides examples only and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile applications, desktop applications, web applications, enterprise applications, and the like. Further, the teachings of this disclosure are not restricted to a particular operating environment (e.g., operating systems, devices, platforms, and the like), but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but the process could have additional steps not included in a figure. A process may correspond to a method, a function, a procedure, a subroutine, a subprogram, and so on. When a process corresponds to a function, its termination may correspond to a return of the function to the calling function or the main function.

The words "example" and "exemplary" are used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and which does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, or memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and so forth may be passed, forwarded, or transmitted via any suitable means including memory sharing, message passing, token passing, network transmission, and so forth.

Furthermore, examples may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a machine-readable medium. A processor(s) may perform the necessary tasks. Systems depicted in some of the figures may be provided in various configurations. In some examples, the systems may be configured as a distributed system where one or more components of the system are distributed across one or more networks in a cloud computing system. Where components are described as being "configured to" perform certain operations, such configuration may be accomplished, for example, by designing electronic circuits or other hardware to perform the operation, by programming or controlling electronic circuits (e.g., microprocessors or other suitable electronic circuits) to perform the operation, or any combination thereof.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method implemented by a computer system, the method comprising:
   receiving, from a device of a customer, input indicating (i) a destination that belongs to a virtual cloud network of the customer and that is to be tested and (ii) a set of vantage points from which the destination is to be tested, wherein a first vantage point of the set corresponds to at least one a geographical region from which traffic to the destination is expected, an on-premises network having access to the destination, or a virtual cloud network subnet;
   causing, based on the input, a first source to be deployed to a first network location associated with the first vantage point and a second source to be deployed to a second network location associated with a second vantage point, wherein the first source is configured to send first probes of different types to the destination, and wherein the second source is configured to send second probes to the destination;
   receiving, from the first source, first probe data based on the first probes sent to the destination, the first probe data indicating a first test metric;
   receiving, from the second source, second probe data based on the second probes sent to the destination, the second probe data indicating a second test metric;
   generating test data based on the first probe data and the second probe data, the test data indicating at least one of connectivity or reachability of the destination; and
   causing the test data to be presented at a user interface.

2. The method of claim 1, further comprising:
   determining a type of the destination; and
   setting, based on the type of the destination, the different types of the first probes to be sent by the first source.

3. The method of claim 1, further comprising:
   determining, based on the input, a type of testing to be performed on the destination; and
   setting, based on the type of testing, the different types of the first probes to be sent by the first source.

4. The method of claim 1, further comprising:
   causing source data to be presented at the user interface, wherein the source data includes at least one of: a network location of the first source, a status of the first source, a type of testing that the first source is performing on the destination, a log of the first probes, or the first probe data.

5. The method of claim 1, further comprising:
   receiving, via the user interface, additional input of the customer indicating a change to testing the destination, the change comprising at least one of: deactivating the first source, activating or adding a third source of probes, updating a type of testing, or changing the set of vantage points; and
   causing the change to be implemented.

6. The method of claim 1, further comprising:
   receiving, from a resource of the customer, traffic data based on the traffic sent by the resource to the destination, wherein the traffic data indicates a third test metric, and wherein the test data is generated further based on the traffic data.

7. The method of claim 1, wherein causing the first source to be deployed comprises instructing, after the input is received, a network virtualization device associated with the first vantage point to instantiate the first source based on a configuration file, wherein the configuration file configures the first source to send the first probes, generate the first test metric based on a response to a probe of the first probes or a lack of response to the probe, send a heartbeat signal, and send the first test metric.

8. The method of claim 1, further comprising:
   determining, based on the first probe data, a first measurement associated with a first probe type and a second measurement associated with a second probe type, wherein the first probe type and the second probe type are parts of the different types of the first probes sent by the first source; and
   determining a network layer at which a connectivity or reachability issue exists based on the first measurement and the second measurement.

9. The method of claim 1, further comprising:
   determining, based on the first probe data, a first network path along which a connectivity or reachability issue exists, the first network path being between the first source and the destination;
   determining, based on the second probe data, a second network path along which the connectivity or reachability issue exists, the second network path being between the second source and the destination; and
   determining a network location of the connectivity or reachability issue based on the first network path and the second network path.

10. The method of claim 1, further comprising:
   determining a network layer at which a connectivity or reachability issue exists based on at least one of the first probe data or the second probe data; and determining a network location of the connectivity or reachability issue based on the first probe data and the second probe data.

11. A system comprising:

one or more processors; and one or more memory storing instructions that, upon execution by the one or more processors, configure the system to:

receive, from a device of a customer, input indicating (i) a destination that belongs to a virtual cloud network of the customer and that is to be tested and (ii) a set of vantage points from which the destination is to be tested, wherein a first vantage point of the set corresponds to at least one a geographical region from which traffic to the destination is expected, an on-premises network having access to the destination, or a virtual cloud network subnet;

cause, based on the input, a first source to be deployed to a first network location associated with the first vantage point and a second source to be deployed to a second network location associated with a second vantage point, wherein the first source is configured to send first probes of different types to the destination, and wherein the second source is configured to send second probes to the destination;

receive, from the first source, first probe data based on the first probes sent to the destination, the first probe data indicating a first test metric;

receiving, from the second source, second probe data based on the second probes sent to the destination, the second probe data indicating a second test metric;

generate test data based on the first probe data and the second probe data, the test data indicating at least one of connectivity or reachability of the destination; and cause the test data to be presented at a user interface.

12. The system of claim 11, wherein the first probes comprise a Layer 3 probe, a Layer 4 probe, and a Layer 7 probe, and wherein the first metric is generated based on a measurement for each one of the Layer 3 probe, the Layer 4 probe, and the Layer 7 probe.

13. The system of claim 12, wherein the first probe data comprises the first metric or an indication of a possible connectivity or reachability issue based on the first metric, and wherein the instructions, upon execution by the one or more processors, further configure the system to:

instruct, the first source, to change a cadence at which the first probes are sent;

receive, from the first source after the cadence is changed, third probe data; and determine that a connectivity or reachability issue exists based on the third probe data.

14. The system of claim 11, wherein the first source is configured to:

send a first probe of a first type to the destination;

generate a first measurement based on a response to the first probe or a lack of response to the first probe;

determine a possible connectivity or reachability issue based on the first measurement; and send a second probe of a second type to the destination, wherein the second probe is sent only after the possible connectivity or reachability issue is determined.

15. The system of claim 11, wherein the instructions, upon execution by the one or more processors, further configure the system to:

receive, from the first source, a first measurement based on a first probe of a first type sent by the first source to the destination;

determine a possible connectivity or reachability issue based on the first measurement; and instruct, after the possible connectivity or reachability issue is determined, the first source to send a second probe of a second type.

16. The system of claim 11, wherein the destination is selected by the input as being at least one of a Layer 3 destination, a layer 4 destination, or a layer 7 destination.

17. The system of claim 11, wherein the input further indicates a payload to include in probes for testing the destination and an expected response, wherein each one of the first probes includes the payload, and wherein the first probe data is generated based on the expected response.

18. One or more non-transitory computer-readable storage media storing instructions that, upon execution on a system, cause the system to perform operations comprising:

receiving, from a device of a customer, input indicating (i) a destination that belongs to a virtual cloud network of the customer and that is to be tested and (ii) a set of vantage points from which the destination is to be tested, wherein a first vantage point of the set corresponds to at least one a geographical region from which traffic to the destination is expected, an on-premises network having access to the destination, or a virtual cloud network subnet;

causing, based on the input, a first source to be deployed to a first network location associated with the first vantage point and a second source to be deployed to a second network location associated with a second vantage point, wherein the first source is configured to send first probes of different types to the destination, and wherein the second source is configured to send second probes to the destination;

receiving, from the first source, first probe data based on the first probes sent to the destination, the first probe data indicating a first test metric;

receiving, from the second source, second probe data based on the second probes sent to the destination, the second probe data indicating a second test metric;

generating first test data based on the first probe data and the second probe data, the first test data indicating at least one of connectivity or reachability of the destination; and causing the first test data to be presented at a user interface.

19. The one or more non-transitory computer-readable storage media of claim 18, wherein the operations further comprise:

generating second test data for a second customer; and determining a network issue pattern based on the first test data and the second test data.

20. The one or more non-transitory computer-readable storage media of claim 18, wherein the operations further comprise:

determining a possible set of network locations of a connectivity or reachability issue based on the first probe data and the second probe data; and performing at least one of:

instructing the first source to probe, instead of the destination, a hop between the first source and the destination;

instructing the first source to change a time to live property of an additional probe sent to the destination; or causing a third source of probes to be deployed.

* * * * *